US006729152B2

(12) United States Patent
Gully et al.

(10) Patent No.: US 6,729,152 B2
(45) Date of Patent: May 4, 2004

(54) THERMAL SHIELD FOR EVAPORATOR WITH PLASTIC OUTER COVERING

(75) Inventors: Sylvain Gully, Rouen (FR); Bernard Valentin, St. Didier Mt d'Or (FR); Philippe Vaas, Mesnil Raoul (FR); Stephane Boudonnet, Le Thuit-Signol (FR)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/004,288

(22) Filed: Oct. 24, 2001

(65) Prior Publication Data

US 2003/0213265 A1 Nov. 20, 2003

(51) Int. Cl.[7] ................................................ F25D 21/08
(52) U.S. Cl. .......................................... 62/276; 62/285
(58) Field of Search .......................... 62/275, 276, 285, 62/288, 291

(56) References Cited

U.S. PATENT DOCUMENTS

| 2,592,394 A | * | 4/1952 | Cochran | ..................... | 312/229 |
| 2,694,297 A | * | 11/1954 | Shoemaker | ................... | 62/276 |
| 3,280,581 A | * | 10/1966 | Turner | ........................ | 219/553 |
| 3,451,226 A | * | 6/1969 | Shriver | ........................ | 62/275 |
| 3,884,048 A | * | 5/1975 | Schneider | .................... | 62/298 |
| 4,907,420 A | * | 3/1990 | Mahanay et al. | ............. | 62/285 |
| 5,255,536 A | * | 10/1993 | Jung et al. | .................... | 62/275 |
| 5,638,693 A | * | 6/1997 | Baek | ........................ | 312/400 |

* cited by examiner

Primary Examiner—William E. Tapolcai
(74) Attorney, Agent, or Firm—Carlson, Gaskey & Olds

(57) ABSTRACT

An evaporator assembly includes a support housing for mounting to an internal compartment of a delivery truck or trailer. At least one evaporator coil mounts to the support housing along with at least one cooling fan. Electric heating strips are attached to the bottom of the evaporator coils to heat the compartment and defrost the evaporator coils. A plastic outer skin incorporates a drain pan to collect condensation and moisture dripping from the evaporator coils during the defrost cycle. A heat shield is attached between the heating strips and the plastic outer covering to prevent heat from damaging the plastic outer covering.

10 Claims, 3 Drawing Sheets

THERMAL SHIELD FOR EVAPORATOR WITH PLASTIC OUTER COVERING

BACKGROUND OF THE INVENTION

This invention relates to a remotely located evaporator assembly including a heating system for a truck climate control system and specifically to construction of a plastic outer covering compatible with the heating system of the evaporator assembly.

Delivery trucks and trailers transporting temperature sensitive cargo include specially designed climate control systems. As one example, a truck refrigeration system includes a motor and a compressor mounted outside of a cargo area. Refrigerant flows from the compressor into the cargo area to at least one remotely located evaporator unit. The refrigerant flows through an evaporator coil in the evaporator and back to the compressor. Cooling fans mounted within the evaporator blow air across the evaporator coils such that the air is cooled and expelled into the cargo area to maintain a desired temperature.

One type of evaporator includes a heating system for heating of the compartment and for defrost of the evaporator coils. Typical heating systems utilize a hot gas or fluid that is flowed into a separate coil adjacent the evaporator coil. Another type of heating system includes electric heating strips positioned below the evaporator coil.

Evaporators mounted within the cargo area are typically composed of a support housing mounted to an interior surface of the cargo area. The evaporator coils and the cooling fans are mounted to the support housing. An outer skin conceals and protects the cooling fans and the evaporator coils. Typically, the outer skin is formed from aluminum. One type of evaporator disclosed in co-pending patent application titled "EVAPORATOR WITH PLASTIC OUTER COVERING", Ser. No. 10/003,549, filed Oct. 24, 2001, and assigned to the applicant of this invention includes a plastic outer covering. The plastic outer covering provides design advantages by reducing overall evaporator weight and by simplifying manufacture and assembly. However, the plastic outer cover is not compatible with evaporators having heating system because the plastic material is susceptible to damage from exposure to the heating system.

For this reason, it is desirable to develop an evaporator assembly including a heating system that can realize the benefits of incorporating a plastic outer covering.

SUMMARY OF THE INVENTION

An embodiment of this invention is an evaporator assembly having a heating system and a plastic outer covering protected from damage from radiant heat by a heat shield positioned between the heating system and the plastic outer covering.

The evaporator assembly includes a support housing for mounting to an internal compartment of a delivery truck or trailer. At least one evaporator coil mounts to the support housing along with at least one cooling fan. A heating system is provided, such as a plurality of electric heating strips positioned below the evaporator. A plastic outer covering encloses and protects the evaporator coil and cooling fans. A drain pan integrally formed within the plastic outer skin collects condensation and moisture dripping from the evaporator coils. A heat shield attached between the drain pan and the heating strips attenuates radiant heat that may otherwise damage the plastic outer covering.

The heat shield includes a plurality of openings to allow moisture to flow through to the drain pan. An embodiment of the heat shield covers the entire drain pan section of the plastic outer covering. Water and moisture within the drain pan may be sprayed from the interior of the evaporator assembly by the blowing cooling fans causing undesirable dripping of water from the evaporator into the cargo and storage area. The heat shield covering the entire drain pan buffets airflow across water within the drain pan to prevent spraying.

The heat shield attenuates the radiation of heat onto a plastic outer covering to prevent damage and allow the use of a plastic outer covering in evaporator assemblies including heating systems to realize of cost and weight benefits associated with the use of plastic outer coverings.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
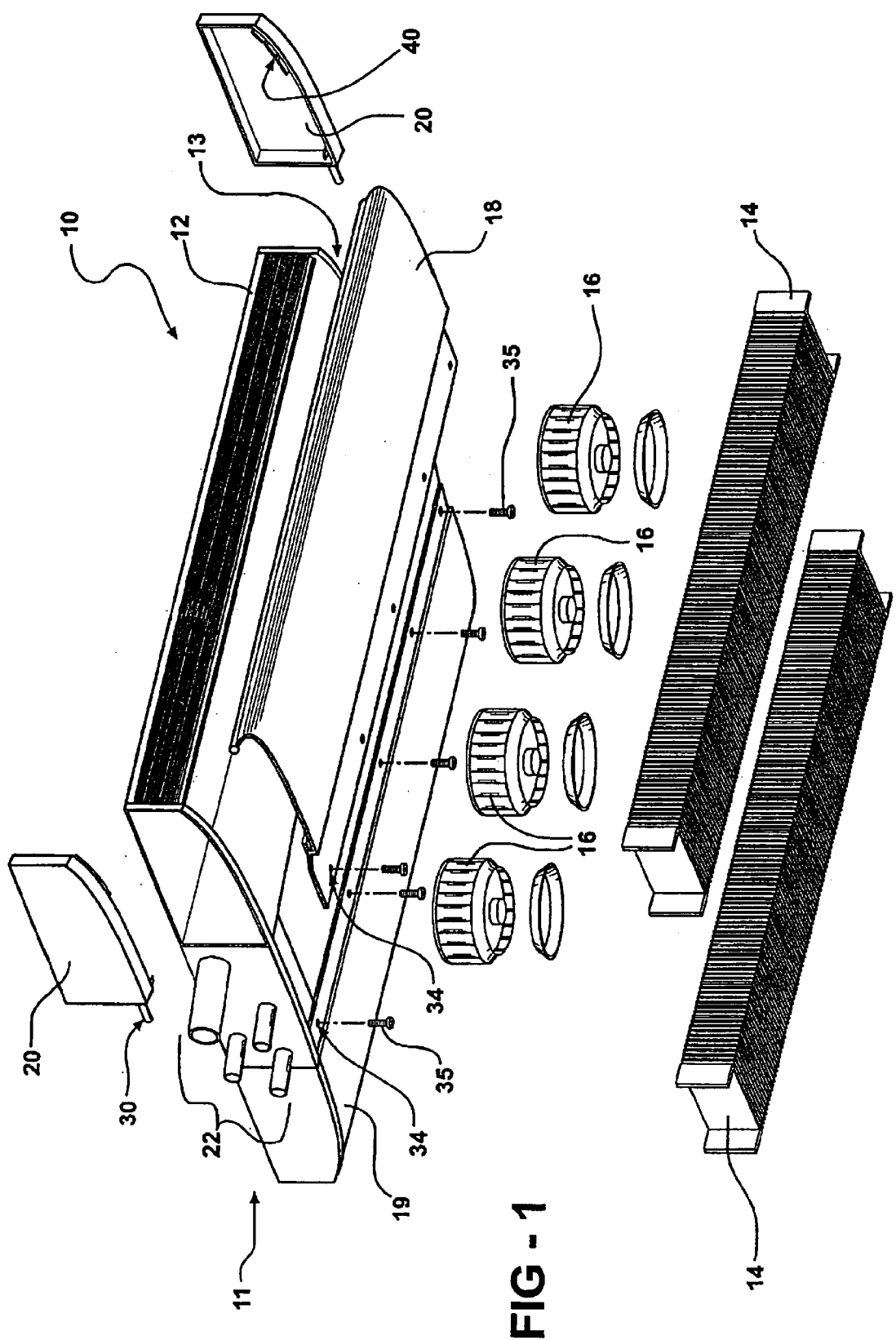
FIG. 1 is an exploded view of an evaporator assembly.

Referring to the Figures, wherein like numerals indicate like or corresponding parts throughout the several views, an embodiment of an evaporator is generally shown at 10 in FIG. 1. The evaporator 10 includes a support housing 12 mounted within climate controlled space. The support housing 12 includes first and second sides 11, 13 that include inlet an outlet tubing 22 from a compressor (not shown). At least one evaporator coil 14 (FIG. 2) attaches to the support housing 12 and is connected by way of the inlet and outlet tubing 22 to the compressor. Evaporator assemblies 10 including two evaporator coils 14 are known as dual discharge and those having only one evaporator coil 14 are signal discharge evaporators. At least one electric fan mounts 16 to the support housing 12 to circulate and force airflow over the evaporator coils 14.

Figure 2:
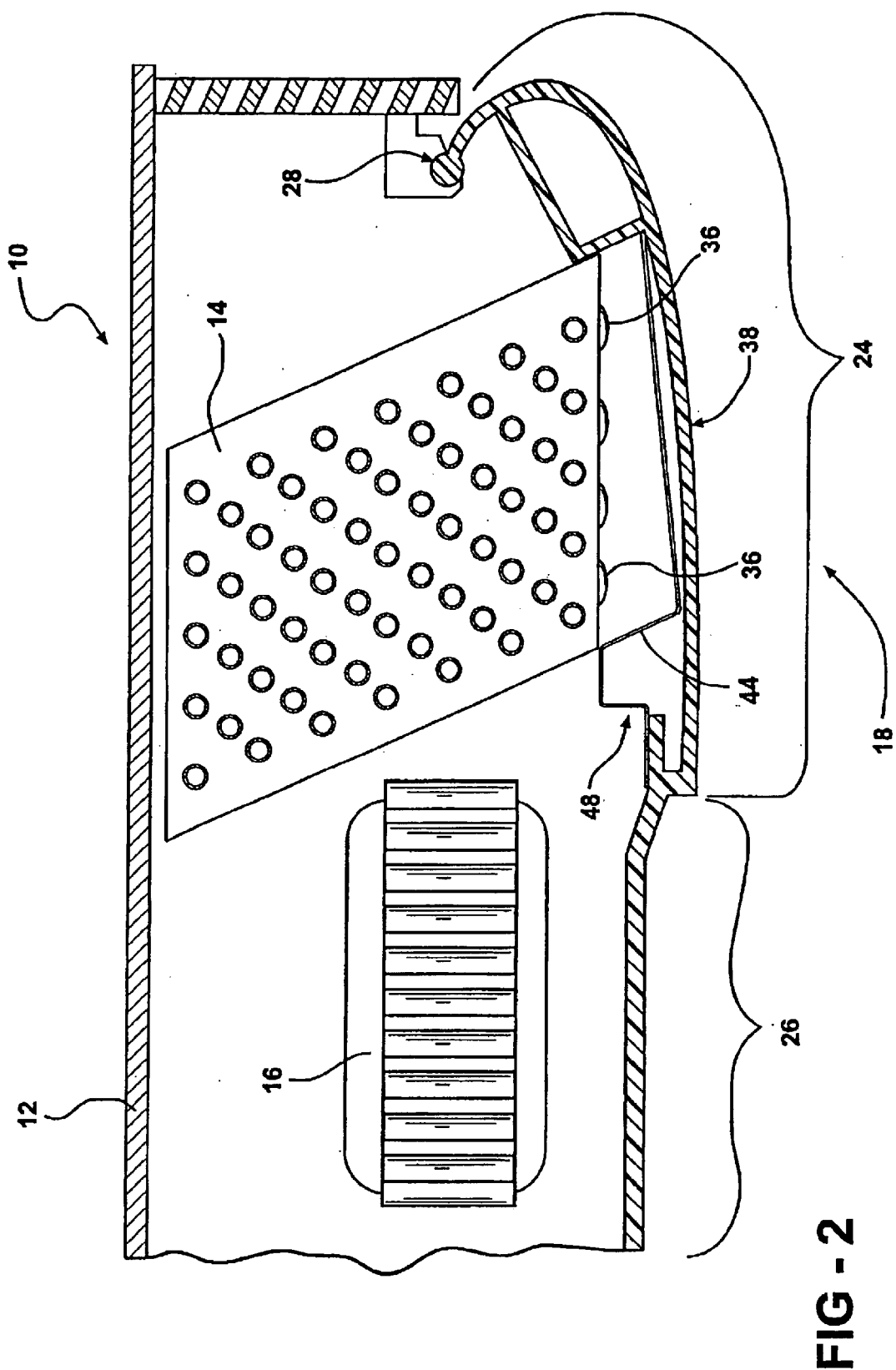
FIG. 2 is a cross-sectional view of the evaporator assembly.

The evaporator assembly 10 shown in FIG. 1 is a dual discharge evaporator including two evaporator coils 14 with the electric fans 16 mounted between the evaporator coils 14. The number of electric fans 16 is dependent on the specific configuration of the evaporator assembly 10. The electric fans 10 can be of any type known in the art. Referring to FIG. 2, the evaporator coils 14 include electric heating elements 36 to defrost the evaporator coils 14 and/or provide heat for controlling the climate in a specific storage area. The heating elements 36 are preferably attached to a bottom side of the evaporator coil 14.

A plastic outer covering 18 attached to the support housing 12, encloses the electric fans 16 and the evaporator coils 14. The plastic outer covering 18 includes a hinge portion 28 that engages a portion of the support housing 12 to form a hinge connection to allow access to the interior of the evaporator assembly 10 without the need to completely remove the outer covering 18. The outer cover 18 is further attached to the support housing 12 on a side opposite the hinge 28 by way of fasteners 35 extending through mounting openings 34.

The outer covering 18 includes an integrally formed drain pan section 24 and panel section 26. The panel section 26 extends over a center section of the evaporator assembly 10 where the electric fans 16 are mounted. The drain pan section 24 is formed as part of a profile 38 of the outer covering 18. The outer covering 18 is formed in a plastic extrusion process known in the art as poltrusion. In this process, plastic material is pushed through a die having the desired profile. This process produces lengths of plastic outer coverings 18 with the desired profile 38. The lengths are then cut to the proper length for assembly to the evaporator assembly 10. The use of the plastic outer covering 18 provides numerous cost and assembly efficiencies and is therefore desirable for use in constructing evaporator assemblies 10.

Figure 3:
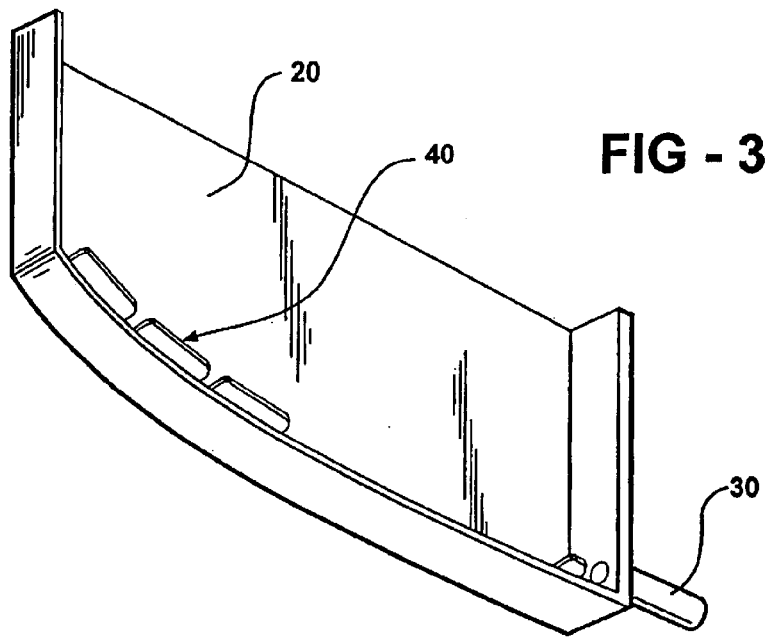
FIG. 3 is a perspective view of one end cap.

Referring to FIG. 3, to complete the assembly of the drain pan section 24 of the outer covering 18 end caps 20 are attached to form sides of the drain pan 24. The end caps 20 are preferably fabricated from plastic material that is adhered to the sides of the outer covering 18 by an industrial adhesive to forms a watertight joint. The end caps 20 include a series of tabs 40 that form a channel into which the outer covering 18 fits to hold and align the end cap 20 to the outer covering 18. At least one of the end caps 20 includes a drain tube 30 for attachment to a drain hose (not shown) to carry water and moisture from the drain pan 24.

The fabrication of the outer covering 18 from plastic provides many benefits to the production of evaporators. These include, as discussed hereinabove, reduced cost and ease of manufacture, along with the favorable thermal properties of the plastic material that eliminates the need for a layer of insulation to prevent condensation built up on the outside of the cover. However, for evaporator assemblies 10 having electric heaters 36, the plastic outer covering 18 is a problem. The heat from the electric heaters 36 can cause deformation of the plastic outer covering 18. To account for this problem the evaporator 10 of this invention includes a heat shield 44 disposed between the plastic outer covering 18 and the electric heater 36 to attenuate heat radiated onto the plastic outer covering 18. The heat shield 44 is fabricated from a material unaffected by the heat produced by the electric heaters 36. Preferably, the heat shield 44 is fabricated from metal formed to fit over the drain pan section of the outer covering. The heat shield 44 attaches to the drain pan section 24 to diffuse the amount of heat radiated from the electric heaters 36 such that the plastic outer covering 18 is not damaged.

Figure 4:
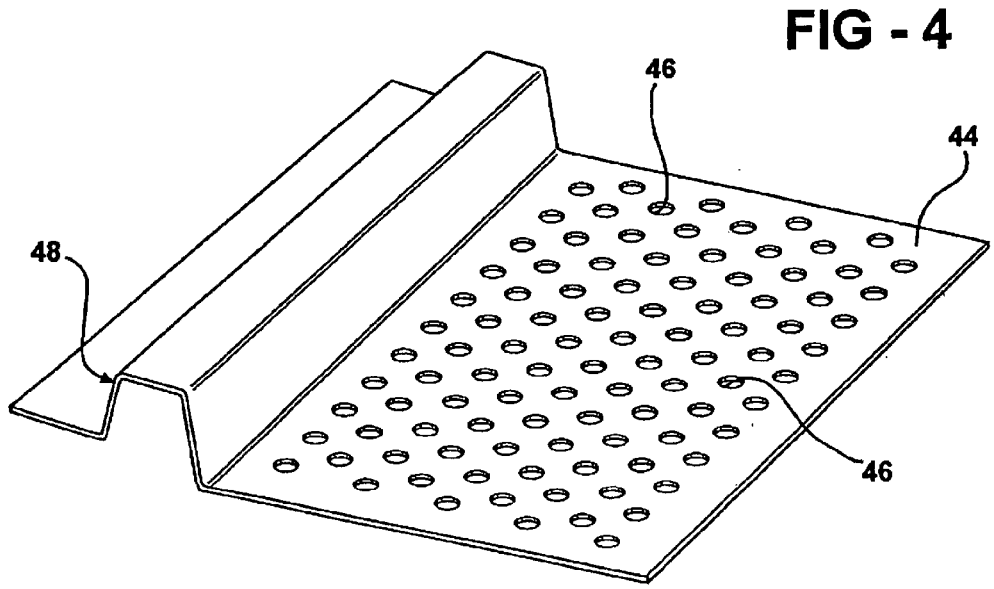
FIG. 4 is a perspective view of a heat shield.

Referring to FIG. 4, a plurality of openings 46 are disposed in the heat shield 44 to allow for the flow of water from the evaporator coils 14 through the heat shield 44 and into the drain pan 24. Airflow from the fans 16 not only flows through the evaporator coils 14 but also over water within the drain pan 24. The heat shield 44 includes a spray shield section 48 that prevents airflow from spraying water in the drain pan 24 from the interior of the evaporator assembly 10.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An evaporator assembly comprising:
   an evaporator coil attached to a support housing;
   a fan attached to said support housing;
   a heater disposed adjacent said evaporator coil;
   a plastic outer covering forming a drain pan portion for collecting moisture; and
   a heat shield disposed in a space between said drain pan portion and said heater to reduce heat radiated onto said drain pan portion.

2. The assembly of claim 1, including end caps attached to said plastic outer covering at said drain pan section, one of said end caps including a drain tube positioned to drain moisture from said integrally formed drain pan.

3. The assembly of claim 2, wherein said heat shield is disposed over said drain pan and includes a plurality of openings to allow moisture to flow through said heat shield and into said drain pan.

4. The assembly of claim 3, wherein said heat shield is attached to said plastic outer covering.

5. The assembly of claim 1, wherein said outer covering includes a hinge that interlocks into said support housing.

6. The assembly of claim 2, wherein said end caps are attached to said outer covering by way of an adhesive.

7. The assembly of claim 1, wherein said outer covering includes a middle section and a drain pan section.

8. The assembly of claim 1, wherein said fan is driven by an alternating current electric motor.

9. The assembly of claim 1, wherein said plastic outer covering is formed from a poltrusion process.

10. The assembly of claim 1, wherein said heater is an electric heater.

* * * * *